(12) United States Patent
Ramunni et al.

(10) Patent No.: US 12,195,365 B2
(45) Date of Patent: Jan. 14, 2025

(54) ELECTRODE FOR ELECTROCHLORINATION PROCESSES

(71) Applicant: INDUSTRIE DE NORA S.P.A., Milan (IT)

(72) Inventors: Anna Ramunni, Milan (IT); Fabio Timpano, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 672 days.

(21) Appl. No.: 16/959,199

(22) PCT Filed: Mar. 13, 2019

(86) PCT No.: PCT/EP2019/056347
§ 371 (c)(1),
(2) Date: Jun. 30, 2020

(87) PCT Pub. No.: WO2019/175280
PCT Pub. Date: Sep. 19, 2019

(65) Prior Publication Data
US 2020/0407249 A1    Dec. 31, 2020

(30) Foreign Application Priority Data
Mar. 14, 2018 (IT) .......... 102018000003533

(51) Int. Cl.
| | | |
|---|---|---|
| *C02F 1/461* | (2023.01) | |
| *C02F 1/467* | (2023.01) | |
| *C02F 103/42* | (2006.01) | |
| *C25B 1/26* | (2006.01) | |
| *C25B 11/093* | (2021.01) | |

(52) U.S. Cl.
CPC ........ *C02F 1/46109* (2013.01); *C02F 1/4674* (2013.01); *C25B 1/26* (2013.01); *C25B 11/093* (2021.01); *C02F 2001/46142* (2013.01); *C02F 2103/42* (2013.01); *C02F 2201/4613* (2013.01)

(58) Field of Classification Search
CPC .................. C02F 1/46109–2001/46171; C25B 11/04–11/097
See application file for complete search history.

(56) References Cited

U.S. PATENT DOCUMENTS

| | | | |
|---|---|---|---|
| 4,003,817 A * | 1/1977 | Bianchi | C25B 11/04 204/290.03 |
| 4,272,354 A | 6/1981 | de Nora et al. | |
| 5,622,613 A | 4/1997 | Arimoto et al. | |
| 2012/0103828 A1 | 5/2012 | Bulan et al. | |

OTHER PUBLICATIONS

International Search Report and Written Opinion for Corresponding International Application No. PCT/EP2019/056347 (May 24, 2019) (9 Pages).
International Preliminary Report on Patentability for Corresponding International Application No. PCT/EP2019/056347 (Feb. 12, 2020) (6 Pages).

* cited by examiner

*Primary Examiner* — Alexander W Keeling
(74) *Attorney, Agent, or Firm* — LUCAS & MERCANTI, LLP

(57) ABSTRACT

The present invention relates to an electrode for electrochlorination processes, optionally operable under polarity reversal conditions, comprising an active layer provided with a doped Ru—Ti catalytic composition.

15 Claims, No Drawings

ELECTRODE FOR ELECTROCHLORINATION PROCESSES

This application is a U.S. national stage of PCT/EP2019/056347 filed on Mar. 13, 2019 which claims the benefit of priority from Italian Patent Application No. 102018000003533 filed Mar. 14, 2018 the contents of each of which are incorporated herein by reference.

FIELD OF THE INVENTION

Electrode for electrochlorination processes optionally operable under polarity reversal conditions and method for producing the same.

BACKGROUND OF THE INVENTION

Electrochlorination processes consist in the production of hypochlorite in salt water via an electrolytic reaction. The resulting sodium hypochlorite may be exploited in a variety of applications concerning water disinfection and oxidation, such as water treatment for drinking water or swimming pools.

Sodium hypochlorite is effective against bacteria, viruses and fungi and has the advantage that microorganisms cannot develop resistance to its effects.

Contrary to chlorine gas or tablets, which may be added to water in order to achieve similar results, in electrochlorination processes the active chemical is produced on site, thus avoiding transportation, environmental and/or storage issues. The process is carried out by applying a suitable current to an electrolytic cell comprising at least two electrodes and an electrolyte containing salt and water. The result of the electrochemical reaction is the production of sodium hypochlorite and hydrogen gas.

Titanium anodes provided with Ru—Ti active coating compositions have been used in the past in these types of cells. These coating compositions may optionally comprise Pd in order to increase the free available chlorine production efficiency. In US 201211 03828 A1 Ru—Ti coating compositions are described further comprising transition metal oxides (Ce, Nb, Sn, V, Cr, Mn, Co, Sb, Zr, Mo, W, Ta) which allow to reduce the ruthenium content. U.S. Pat. No. 4,272,354 describes Ru—Ti coating compositions further containing tin dioxide enhanced by the addition of bismuth trioxide. U.S. Pat. No. 4,003,817 A describes coating compositions containing a platinum group metal oxide, titanium dioxide and a doping oxide such as oxides of tin, lanthanum, aluminium, cobalt, antimony, molybdenum, tungsten, tantalum, vanadium, phosphorus, boron, beryllium, sodium, calcium, strontium, and mixtures thereof.

However, in order to ensure high efficiency under a variety of operation conditions, increase electrode stability and reduce electrode costs, alternative electrodes to the ones known in the art, with comparable or higher efficiency, are desirable.

Furthermore, in order to prevent/reduce the formation of scales on the electrodes, which negatively impact on the hypochlorite production efficiency of the cell, a periodic polarity inversion may be applied to the electrodes so as to promote their self-cleaning. Reversing the polarity also reduces ion bridging between the electrodes and may prevent uneven electrode wear.

However, some elements occasionally used in the active coating composition, such as palladium, are not stable under polarity reversal and dissolve in the electrolyte after few inversion cycles, thereby leading to inadequate electrode lifetimes.

Furthermore, the swimming pool industry has been successfully introducing into the market pools operating at lower salt levels, such as for example 1 g/l of NaCl instead of the conventional value of 2.5-4 g/l, in order to minimize corrosion issues of salt pools. Traditional Ru—Ti coatings at this lower salt level pay penalties in terms of efficiency. This deficiency cannot be remedied by the addition of Pd in case of polarity reversal applications because of its instability under such operating conditions. Additionally, Pd is an expensive noble metal that increases the overall upfront costs of an electrochlorination system if used in substantial quantities within the electrode coating.

It is therefore desirable to have electrodes for electrochlorination processes exhibiting improved efficiency and lifetimes under a wide spectrum of possible applications and operative conditions, optionally including polarity reversal conditions, and possibly maintaining reduced production costs.

It is furthermore desirable to have electrodes for electrochlorination processes, optionally self-cleaning, for use in low salinity applications, such as for example low-salt pools (operating at 0.5-2.5 g/l NaCl) or for functional water generation (operating at few ppm of Cl—).

SUMMARY OF THE INVENTION

Under one aspect, the present invention relates to an electrode suitable for electrochlorination processes comprising a valve metal substrate and at least one active layer comprising a Ru—Ti catalytic composition doped with at least a first doping agent X (chosen from Sc, Sr, Hf, their mutual combinations and their oxides) as described and claimed hereinafter.

Under another aspect, the present invention relates to an electrode suitable for electrochlorination processes comprising a valve metal substrate and at least one active layer comprising a Ru—Ti catalytic composition doped with at least a first doping agent X (chosen from Sc, Sr, Hf, Bi, Zr, Al, their mutual combinations and their oxides) and a second doping agent Y (chosen from Cu, Rh, Ir, Pt, their mutual combinations and their oxides), and optionally a third doping agent Z (chosen from Pd and its oxides), as described and claimed hereinafter.

Under another aspect, the present invention relates to a method for manufacturing the electrodes according to the invention.

Under another aspect, the present invention relates to a process for hypochlorite mediated water disinfection employing the electrode according to the invention.

Under another aspect, the present invention relates to the use of the electrode according to the invention in swimming pools, in particular low-salinity pools, or for functional water generation.

DETAILED DESCRIPTION OF THE INVENTION

Under one aspect, the present invention relates to an electrode suitable for electrochlorination processes comprising a valve metal substrate and at least one active layer comprising a catalytic composition of ruthenium, titanium and at least a first doping agent X or oxides thereof, optionally at least a second doping agent Y and optionally a third doping agent Z.

According to a first embodiment, the electrode of the present invention contains only said first doping agent X. In this embodiment, ruthenium is between 20-50%, titanium is equal or below 7.5% and X is between 0.5-7%, expressed in weight percentage referred to the elements; X being selected from: scandium, strontium, hafnium and combinations of at least two of scandium, strontium, hafnium, bismuth, zirconium, aluminium.

According to a second embodiment, the electrode of the present invention contains said first doping agent X and at least said second dopant. In this embodiment, ruthenium is between 20-50%, titanium is equal or below 79.3%, X is between 0.5-7% and Y is between 0.2-3.2%, expressed in weight percentage referred to the elements; X being selected from: scandium, strontium, hafnium, bismuth, zirconium, aluminium and their mutual combinations and Y being selected from the group consisting of copper, rhodium, platinum, iridium and combinations thereof.

The mutual combination of elements includes all permutations of the X-type elements taken in pairs.

The electrode according to the invention contains an amount of titanium equal or less than 79.5%, depending on the presence or absence of additional elements, such as further doping elements, which are added at the expense of the titanium content in the catalytic composition.

The titanium content in the catalytic composition may typically be above 37.6%, preferably above 50.6%, even more preferably above 58.9%, as it may positively impact on the electrode durability.

In case of a catalytic composition consisting of Ru—Ti—X, ruthenium is 20-50%, X is 0.5-7% and Ti is 43-79.5%.

The addition of Sc, Sr, Hf, alone or combinations of Sc, Sr, Hf, Bi, Zr and Al to the Ru—Ti composition, was observed to significantly enhance free available chlorine efficiency of the Ru—Ti catalytic coating up to 85% with respect to a non-doped Ru—Ti composition, at all typical salinity levels for commercial operations, but particularly at low salinity levels of 0.5-2.5 g/l NaCl.

For what concerns the doping agent X, examples of elements/combinations that have been found to work particularly well in the execution of the invention are Sc, Sr, Hf, Sc—Sr, Sc—Hf, Sc—Bi, Sc—Zr, Sr—Hf, Sr—Bi, Sr—Zr, Hf—Bi, Hf—Zr, Bi—Zr, Sc—Al, Sr—Al, Hf—Al, Bi—Al, Zr—Al.

The addition of aluminium as first doping agent improves the electrode efficiency, but it may occasionally exhibit stability issues when used alone. Such issues are reduced when Al is used in combination with the other X dopants Sc, Sr, Hf, Bi, Zr.

By analysing the results of the experiments performed on the compositions according to the invention, the inventors have observed that the NaOCl efficiency q of the X-doped electrode is, in a first rough approximation, an additive function of the efficiency of the single elements Sc, Sr, Hf, Bi, Zr or Al. Hence, if X is the combination of elements X1 and X2 the efficiency of Ru—Ti doped with X1-X2 is, approximately, the weighted average of the efficiency of Ru—Ti doped with X1 and of the efficiency of Ru—Ti doped with X2.

Without wishing to limit the invention to a particular theory, the increase in efficiency of the electrode according to the invention may be related to the fact that the addition of small amounts of Sc, Sr, Hf, Bi, Zr or Al to the active layer increases the cell volume of its Ti-based matrix, thereby leading to a larger active area and availability of the Ru electro-catalyst, which results in NaOCl efficiencies above or equal to 45%, and above 50% where the doping agent X is chosen from Sc, Sr, Zr or combinations of at least two of scandium, strontium, hafnium, bismuth, zirconium, aluminium.

The valve metal substrate of the electrode according to the invention may be, for example, titanium.

The electrode according to the invention above has been observed to exhibit surprisingly increased efficiency when Ru, Ti and X are in the preferred quantities of 25-40% Ru, 1-5% X, and less than 74% Ti (preferably at least 50%) and even more preferably 27-35% Ru, 71% or less Ti (preferably above 58%), and 2-3% X.

Electrodes with a catalytic composition consisting of Ru—Ti—X may therefore contain 25-40% Ru, 55-74% Ti, and 1-5% X, preferably 27-35% Ru, 62-71% Ti, and 2-3% X.

Besides the claimed active layer, additional layers (such as protective layers above or below the active layer) may be introduced without departing from the scope of the invention.

The improved efficiency of the electrode according to the invention seems related to the specific quantities of the claimed doping agent X, whose addition may produce measurable advantages.

However, while the doping agent X provides an increase in electrode efficiency, it might not advantageously impact, if used alone, on the lifetime of the electrode, especially when the latter is subject to current reversals.

The inventors have observed that the addition of a second doping agent Y to the first doping agent X allows to reach excellent electrode lifetimes in case the electrode is subject to polarity inversion, provided Y is copper, rhodium, iridium, platinum or their combination. Also the corresponding oxides may be used.

Thus, according to the above mentioned second embodiment, the catalytic composition of the electrode according to the present invention comprises 20-50% Ru, at most 79.3% Ti, 0.5-7% X and 0.2-3.2% Y. Preferably, the catalytic composition comprises 25-40% Ru, less than 73.6% Ti, 1-5% X, and 0.4-2.4% Y; even more preferably 27-35% Ru, 70.4% or less Ti, 2-3% of X, and 0.6-1.7% Y.

Electrodes with a catalytic composition consisting of Ru—Ti—X—Y will therefore contain 20-50% Ru, 39.8-79.3% Ti, 0.5-7% X and 0.2-3.2% Y; preferably 25-40% Ru, 52.6-73.6% Ti, 1-5% X, and 0.4-2.4% Y; even more preferably 27-35% Ru, 60.3-70.4% Ti, 2-3% of X, and 0.6-1.7% Y.

The electrodes composed with the specific small additions of the efficiency dopant X and the stabilising dopant Y according to any of the embodiments above exhibit very good stability under current reversal without paying any penalties in terms of efficiency. Therefore, these electrodes may be advantageously used in a variety of electrochlorination processes, regardless of whether they involve polarity inversion or not. Examples of applications include functional water generation and swimming pools, particularly low salinity pools.

Examples of X-Y combinations that have been found to work particularly well in the execution of the invention are: Sc—Rh and Sc—Cu. Zr—Rh, Bi—Rh, Bi—Cu combinations have also been found very satisfactory.

Under a further embodiment, the catalytic composition according to the present invention comprises or consists of Ru—Ti—Sc—Rh, Ru—Ti—Sc—Cu, Ru—Ti—Bi—Rh, Ru—Ti—Bi—Cu, Ru—Ti—Zr—Rh.

Alternatively, the catalytic composition of the electrode according to a further embodiment of the present invention comprises or consists of Ru—Ti—Sr—Rh, Ru—Ti—Sr—

Cu, Ru—Ti—Hf—Rh, Ru—Ti—Hf—Cu, Ru—Ti—Zr—Cu, Ru—Ti—Sc—Rh—Cu, Ru—Ti—Bi—Rh—Cu, Ru—Ti—Sc—Bi—Rh—Cu.

Under a third embodiment the catalytic composition of the electrode of the present invention further comprises a third doping agent Z or its oxides, Z being palladium, with the catalytic composition comprising 20-50% Ru, at most 79.1% Ti, 0.5-7% X, 0.2-3.2% Y and 0.2-2.2% Z.

Preferably, the catalytic composition contains 25-40% Ru, less than 73.3% Ti, 1-5% X, 0.4-2.4% Y, and 0.3-2% Z.

Even more preferably, the catalytic composition contains 27-35% Ru, 70.4% or less Ti, 2-3% of X, 0.6-1.7% Y and 0.5-1.4% of Z.

The inventors observed that the compositions above, with the addition of the dopant Z, exhibit increasingly high lifetime and efficiencies, even under polarity inversion conditions. It has been surprisingly noted that palladium, in the small amounts indicated hereinbefore, does not adversely impact on the duration of the electrode when in combination with the dopants X and Y, even under polarity inversion.

Additionally, the inventors observed that the addition of aluminium to the Ru—Ti composition, in combination with the dopant Y (and optionally the dopant Z) and in the quantities hereinbefore described, allows the electrode to perform in a very stable and reliable fashion over time, thereby overcoming any issues that the element may exhibit when used alone or, to a minor extent, in combination with other X-type dopants.

Therefore, there seems to be a synergic effect that allows the different technical effects of the elements X, Y, Z, taken alone, not to be cancelled out when combined together.

An X—Y—Z combination that has been found to work particularly well both in terms of efficiency and lifetime is Sc—Rh—Pd. Other examples of X—Y—Z combinations that have been found to work well in the execution of the invention are Sc—Cu—Pd, Zr—Rh—Pd, Bi—Rh—Pd, and Bi—Cu—Pd. Other satisfactory compositions are Ru—Ti—Sc—Rh—Al, Ru—Ti—Sc—Cu—Al, Ru—Ti—Bi—Rh—Al, Ru—Ti—Bi—Cu—Al, Ru—Ti—Zr—Rh—Al, Ru—Ti—Sc—Rh—Cu—Al, Ru—Ti—Sc—Rh—Al—Pd, Ru—Ti—Sc—Cu—Al—Pd, Ru—Ti—Sc—Rh—Cu—Al—Pd.

Under a further aspect, the present invention relates to a method for manufacturing an electrode according to any one of the embodiments hereinbefore described comprising: (i) applying a catalytic solution containing precursors of ruthenium, titanium and of the doping agent X to a valve metal substrate, (ii) subsequently performing a thermal decomposition step by executing a thermal treatment in air at a temperature between 450-500° C.

The catalytic solution may additionally contain precursors of the doping agent Y in case the resulting electrode is manufactured to comprise a catalytic composition of the Ru—Ti—X—Y type as hereinbefore described.

The catalytic solution may further contain precursors of the efficiency booster doping agent Z in case the resulting electrode is manufactured to comprise a catalytic composition of the Ru—Ti—X—Y—Z type as hereinbefore described.

Optionally, the valve metal substrate is etched before application of the catalytic solution prior to the thermal decomposition step.

The coated valve metal substrate may be air dried before the thermal decomposition step.

The active layer can be formed by executing the above manufacturing method once (i.e. with just one hand of coating), with or without the optional steps described.

Alternatively, the above method may be repeated several times for each hand of catalytic coating, with or without the optional steps described, until the desired Ru loading is achieved.

Under a further aspect, the present invention is directed to a process for hypochlorite mediated water disinfection comprising the steps of: (i) flowing an aqueous solution containing NaCl between two opposite electrodes, where at least one is the electrode according to the invention as hereinbefore described, (ii) applying an external voltage between said two opposite electrodes thereby producing hypochlorite in said aqueous solution.

Under a further aspect, the present invention is directed to a low salinity pool implementing the process for hypochlorite mediated water disinfection described above. The following examples are included to demonstrate particular ways of reducing the invention to practice, whose practicability has been largely verified in the claimed range of values.

It should be appreciated by those of skill in the art that the equipment, compositions and techniques disclosed in the following represent equipment, compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

EXPERIMENT PREPARATION

In all the electrode samples used in the following EXAMPLE, COUNTEREXAMPLE and COMPARATIVE EXAMPLES, the electrode substrate was manufactured starting from a titanium grade 1 plate of 100 mm×100 mm×1 mm size, degreased with acetone in an ultrasonic bath for 10 minutes. The plate was then subjected to grit blasting to obtain a surface roughness value Rz above 25 µm, and was subsequently annealed for 6 hours at 650° C. Finally, the plate was etched in a solution containing 22% by weight of HCl at boiling temperature for 30 minutes, resulting in a total weight loss of 200 g/m².

Example 1

The catalytic solutions Se1-Se14 used for the preparation of samples E1-E14 listed in TABLE 1 were all obtained by dissolving chloride salts of ruthenium, titanium, and of the doping agents X, Y, and Z as applicable, in aqueous HCl at 10%, with a final concentration of ruthenium in each catalytic solution equal to 40 g/l. Each of the solutions Se1-Se14 contained the precursors of the elements listed in TABLE 1 (under "Composition"), in accordance with the corresponding weight percentages referred to the elements (provided under "Weight composition").

The solutions thus prepared were stirred for 30 minutes.

Samples E1-E14 were obtained by coating the titanium substrates described above with solutions Se1-Se14 respectively, each solution was applied by brush with a gain rate of 0.8 g/m² of ruthenium.

After each coating application the samples were air-dried at 60° C. for 10 minutes and subsequently baked at a temperature between 450° C.-500° C. for up to 15 minutes. The coating procedure above was repeated for each sample E1-E14, using the same corresponding catalytic solution Se1-Se14, until achieving a loading of Ru equal to 20 g/m². Each sample underwent a post-bake treatment for 3 hours at a temperature between 500° C.-550° C. The resulting electrode samples E1-E14 according to the invention were then tested and characterised according to the procedure set out in COMPARATIVE EXAMPLE 1 and 2.

TABLE 1

| Catalytic Solution | Composition | Weight composition (w %) | | | | | Electrode Sample |
|---|---|---|---|---|---|---|---|
| | | Ru | Ti | X | Y | Z | |
| Se1 | RuTiScRh | 30 | 67 | 2 | 1 | — | E1 |
| Se2 | RuTiScCu | 25 | 71.5 | 2.5 | 1 | — | E2 |
| Se3 | RuTiScCuRh | 25 | 71.5 | 2 | 1Cu + 0.5Rh | — | E3 |
| Se4 | RuTiBiRh | 25 | 69 | 5 | 1 | — | E4 |
| Se5 | RuTiBiCu | 25 | 69 | 5 | 1 | — | E5 |
| Se6 | RuTiZrRh | 30 | 67 | 2 | 1 | — | E6 |
| Se7 | RuTiZrCu | 30 | 67 | 2 | 1 | — | E7 |
| Se8 | RuTiHf | 25 | 70 | 5 | — | — | E8 |
| Se9 | RuTiScRhPd | 30 | 66 | 2 | 1 | 1 | E9 |
| Se10 | RuTiScCuPd | 30 | 66 | 2 | 1 | 1 | E10 |
| Se11 | RuTiSc | 25 | 72.5 | 2.5 | — | — | E11 |
| Se12 | RuTiSr | 25 | 65 | 7 | — | — | E12 |
| Se13 | RuTiScSr | 25 | 72 | Sc:1, Sr:2 | | | E13 |
| Se14 | RuTiScZr | 25 | 72 | Sc:1; Zr:2 | | | E14 |

Counterexample 1

The samples C1-C2 listed in TABLE 2 and the corresponding catalytic solutions Sc1-Sc2 used for their preparation were obtained according to the same procedure described in EXAMPLE 1, where each of the solutions Sc1-Sc2 contained the precursors of the elements listed in TABLE 2 according to the respective weight percentages indicated therein.

TABLE 2

| Catalytic Solution | Composition | Weight composition (w %) | | | | | Electrode Sample |
|---|---|---|---|---|---|---|---|
| | | Ru | Ti | X | Y | Z | |
| Sc1 | RuTi | 25 | 75 | — | — | — | C1 |
| Sc2 | RuTiIrPd | 20 | 50 | | 20 | 10 | C2 |

COMPARATIVE EXAMPLE 1

Each electrode sample E1-E14 according to EXAMPLE 1 and each electrode sample C1-C2 according to COUNTEREXAMPLE 1 were conditioned overnight to stabilize their performance: all electrodes E1-E14, C1-C2 were used as anodes in a beaker containing an aqueous solution of NaCl at 29 g/l, with a counter-electrode (a titanium plate cathode) placed at an interelectrodic distance of 2 mm, and each anode-cathode pair was operated at a current density of 1 kA/m$^2$.

The efficiency of the electrode pairs above was then tested in a beaker containing 1 l of an aqueous solution of 1 g/l of NaCl. The solution was at a temperature of 25° C.±2° C. and the electrodes operated at a current density of 300 A/m$^2$ for 45 minutes.

At the end of the experiment the hypochlorite concentration generated in the aqueous solution was determined by iodometric titration.

The efficiency of the electrode was determined as the ratio between the actual concentration of NaOCl versus the theoretical concentration, calculated according to Faraday law of electrolysis, expressed in percentage.

The results of the efficiency test for electrodes E1-E14, C1-C2 are listed in TABLE 3.

Comparative Example 2

Two sets of electrodes E1-E14 and two sets of electrodes C1-C2 were prepared according to EXAMPLE 1 and COUNTEREXAMPLE 1 respectively.

Each electrode couple E1-E1, E2-E2, . . . , E14-E14, C1-C1, . . . , C2-C2 featured an interelectrodic gap of 3 mm and was inserted in a dedicated beaker containing 1 l of an aqueous solution containing 4 g/l of NaCl and 70 g/l of Na$_2$SO$_4$.

All electrode couples were operated at a current density of 1000 A/m$^2$ and were subject to polarity inversion every 1 minute during the test duration. Each electrode couple was kept in testing conditions until cell voltage exceeded 8.5 volt (the "Accelerated Lifetime", measured in hours for each g/m$^2$ of ruthenium in the catalytic composition).

TABLE 3

| Sample Electrode | Efficiency (%) | Accelerated Lifetime (hours per g/m$^2$ of Ru) |
|---|---|---|
| E1 | 62% | 13.4 |
| E2 | 60% | 9 |
| E3 | 55% | 8.1 |
| E4 | 65% | 7.3 |
| E5 | 60% | 6.9 |
| E6 | 55% | 11.3 |
| E7 | 61% | 9.5 |
| E8 | 45% | 5.7 |
| E9 | 74% | 9.9 |
| E10 | 64% | 7.3 |
| E11 | 56% | 4.1 |
| E12 | 52% | 3.5 |
| E13 | 53% | 4.1 |
| E14 | 57% | 5 |
| C1 | 40% | 9.5 |
| C2 | 60% | 3 |

The previous description shall not be intended as limiting the invention, which may be used according to different embodiments without departing from the scopes thereof, and whose extent is solely defined by the appended claims.

Throughout the description and claims of the present application, the term "comprise" or "contains" and variations thereof such as "comprising" and "comprises" are not intended to exclude the presence of other elements, components or additional process steps. The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. An electrode suitable for electrochlorination processes comprising a valve metal substrate and at least one active layer comprising a catalytic composition of ruthenium, titanium and at least a first doping agent X or oxides thereof, wherein ruthenium is between 20-50%, titanium is equal or below 79.5% and X is between 0.5-7% expressed in weight percentage referred to the elements, X is selected from the group consisting of scandium, strontium, hafnium and combinations of at least two of scandium, strontium, hafnium, bismuth, zirconium, aluminium, wherein the catalytic composition is selected from the group consisting of RuTiHf, RuTiSc, RuTiSr, RuTiScSr and RuTiScZr.

2. The electrode according to claim 1, wherein the catalytic composition comprises 27-35% of ruthenium, 71% or less of titanium and 2-3% of X.

3. Method for manufacturing an electrode according to claim 1 comprising applying a solution comprising precursors of ruthenium, titanium and said doping agent X to a valve metal substrate and subsequently decomposing said solution by a thermal treatment in air at a temperature between 450° C.-500° C.

4. The method according to claim 3, wherein said solution further comprises precursors of doping agent Y selected from the group consisting of copper, rhodium, platinum, iridium and combinations thereof.

5. The method according to claim 4, wherein said solution further comprises precursors of doping agent Z, wherein Z is palladium.

6. Process for hypochlorite mediated water disinfection comprising the following steps:
   flowing an aqueous solution containing NaCl between two opposite electrodes, where at least one of said two opposite electrodes is the electrode according to claim 1,
   applying an external voltage between said two opposite electrodes thereby producing hypochlorite in said aqueous solution.

7. Low salinity pool implementing the process according to claim 6.

8. An electrode suitable for electrochlorination processes comprising a valve metal substrate and at least one active layer comprising a catalytic composition of ruthenium, titanium and at least a first doping agent X or oxides thereof and a second doping agent Y or oxides thereof, wherein ruthenium is between 20-50%, titanium is equal or below 79.3%, X is between 0.5-7% and Y is between 0.2-3.2%, expressed in weight percentage referred to the elements, X is selected from the group consisting of scandium, strontium, hafnium, bismuth, zirconium, aluminium and combinations thereof, Y is selected from the group consisting of copper, rhodium, platinum, iridium and combinations thereof, wherein the catalytic composition is selected from the group consisting of RuTiZrCu, RuTiScRh, RuTiScCu, RuTiScCuRh, RuTiBiRh, RuTiBiCu and RuTiZrRh.

9. The electrode according to claim 8, wherein the catalytic composition comprises 27-35% of ruthenium, 70.4% or less of titanium, 2-3% of X, and 0.6-1.7% of Y.

10. Process for hypochlorite mediated water disinfection comprising the following steps:
    flowing an aqueous solution containing NaCl between two opposite electrodes, where at least one of said two opposite electrodes is the electrode according to claim 8,
    applying an external voltage between said two opposite electrodes thereby producing hypochlorite in said aqueous solution.

11. Low salinity pool implementing the process according to claim 10.

12. The electrode according to 8, wherein the catalytic composition further comprises 0.2-2.2% of a third doping agent Z or its oxides, Z being palladium and wherein the catalytic composition is selected from the group consisting of RuTiScRhPd and RuTiScCuPd.

13. The electrode according to claim 5, wherein the catalytic composition comprises 27-35% of ruthenium, 69.9% or less of titanium, 2-3% of X, and 0.6-1.7% of Y and 0.5-1.4% of Z.

14. Process for hypochlorite mediated water disinfection comprising the following steps:
    flowing an aqueous solution containing NaCl between two opposite electrodes, where at least one of said two opposite electrodes is the electrode according to claim 12,
    applying an external voltage between said two opposite electrodes thereby producing hypochlorite in said aqueous solution.

15. Low salinity pool implementing the process according to claim 14.

* * * * *